(No Model.)
J. MABBS.
PNEUMATIC ELEVATOR.
No. 355,697. Patented Jan. 11, 1887.
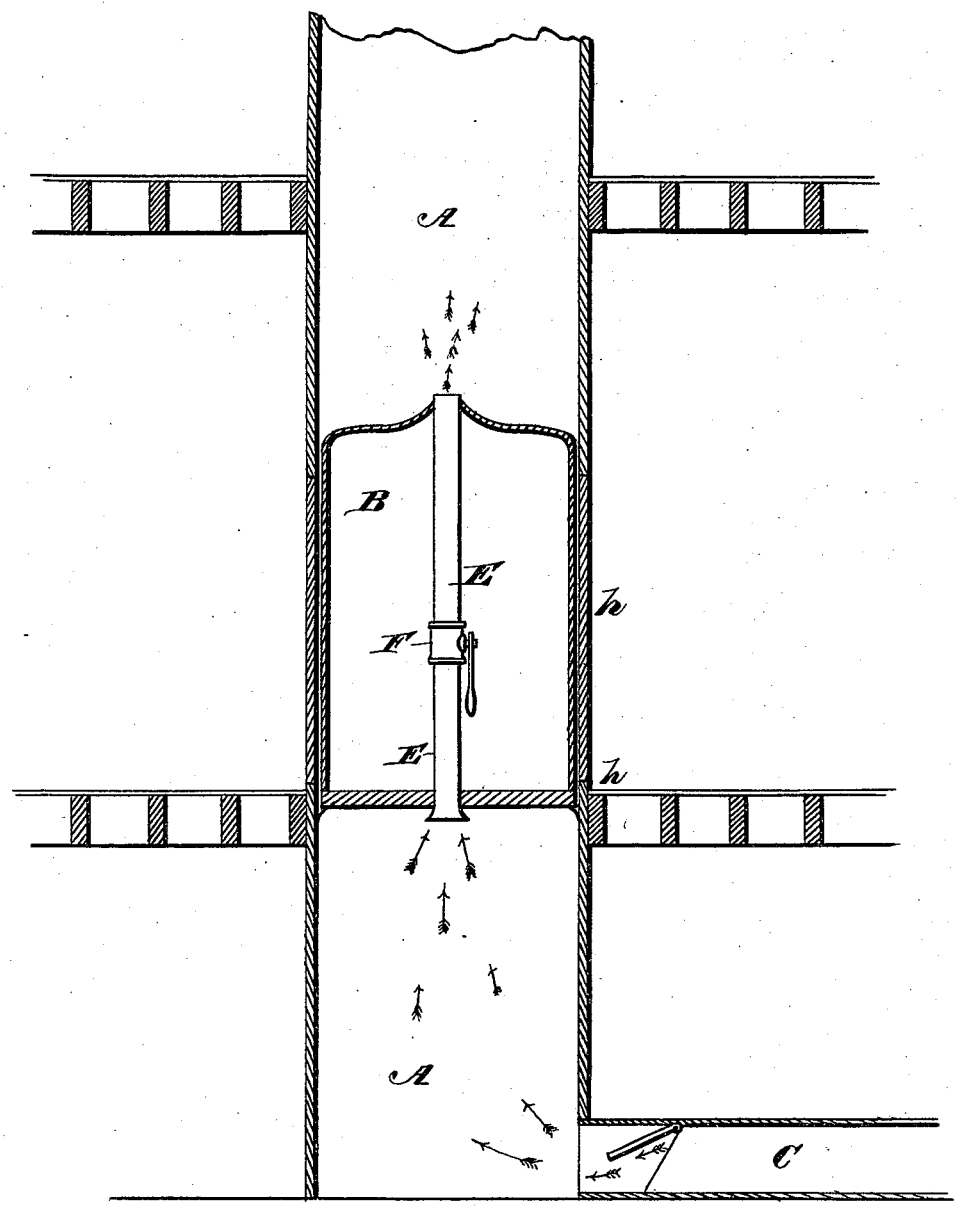
Witnesses.
Inventor:
John Mabbs.
By West & Bond.
Attys.

UNITED STATES PATENT OFFICE.

JOHN MABBS, OF CHICAGO, ILLINOIS.

PNEUMATIC ELEVATOR.

SPECIFICATION forming part of Letters Patent No. 355,697, dated January 11, 1887.

Application filed August 5, 1886. Serial No. 210,132. (No model.)

*To all whom it may concern:*

Be it known that I, JOHN MABBS, a citizen of the United States, residing at Chicago, in the county of Cook and State of Illinois, have invented a new and Improved Pneumatic Passenger-Elevator, of which the following is a specification.

My invention applies more particularly to passenger-elevators, but is applicable to any kind.

The object of my invention is to prevent the possibility of the elevator-car falling and causing such terrible frights and great loss of life and limb as are constantly occurring in connection with elevators now in use, where the car depends for its support upon ropes, cables, screws, pulleys, racks and pinions, or any mechanical device whatsoever, which are liable to inherent weaknesses, subject to constant wear, and liable to breakage, with such terrible results. I attain this object by applying the power, compressed air, which is supplied by a blower or air compressor through a pipe or passage at the bottom of the air tight elevator-shaft, directly to the car itself without any intermediate device whatsoever, causing the car to ascend or float upon the air, which cannot escape, as the car fits the shaft air-tight, and all openings are provided with air-tight doors and automatic valves. So the car ascends or descends, at the will of the conductor, simply by retaining or allowing the air to escape by closing or opening the operating-valve in the car.

The accompanying drawing illustrates the device and application.

A A is the air-tight elevator-shaft.

B is the elevator-car, made to fit the shaft air tight.

C is an air-passage from blower or air-forcing machine to the elevator-shaft.

D is an automatic valve in air-passage at the bottom of the shaft, to prevent the escape of air in case of failure of supply.

E E denote an air-passage through car to allow the air to escape.

F is an operating-valve in air-passage E E, which is under the control of the conductor, to regulate the movements of the car.

h h are air-tight doors on each floor, which are impossible to be opened from the outside.

I am aware that prior to my invention compressed air has been used as the motive power for elevators, by means of cylinders, cables, sheave-wheels, and other intermediate devices. I therefore make no claim to the use of compressed air as a motive power for elevators; but What I do claim as my invention, and desire to secure by Letters Patent, is—

1. The combination, with an elevator-shaft having direct connection at its lower end with air-compressing mechanism, of an elevator-car fitting and moving in said shaft and an air-passage carried through said car and discharging into the shaft above the same, substantially as described.

2. The combination, with an elevator-shaft having connection at its lower end with a flue, C, for compressed air, of a car, B, fitting and moving in said shaft, an air passage or tube, E, passing through the car and opening below and above it, and a shut-off or valve, F, substantially as described.

JOHN MABBS.

Witnesses:
J. W. MABBS,
ROBT. S. WORTHINGTON.